US012547424B2

United States Patent
Singh et al.

(10) Patent No.: US 12,547,424 B2
(45) Date of Patent: Feb. 10, 2026

(54) MANAGING CONNECTION CONFIGURATIONS OF COMPUTING COMPONENTS OF INFORMATION HANDLING SYSTEMS

(71) Applicant: Dell Products L.P., Round Rock, TX (US)

(72) Inventors: Vishal Kumar Singh, Bangalore (IN); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 18/669,930

(22) Filed: May 21, 2024

(65) Prior Publication Data

US 2025/0362931 A1    Nov. 27, 2025

(51) Int. Cl.
*G06F 9/44* (2018.01)
*G06F 9/445* (2018.01)

(52) U.S. Cl.
CPC .............................. *G06F 9/44505* (2013.01)

(58) Field of Classification Search
CPC ..................................... G06F 9/44; G06F 1/32
See application file for complete search history.

(56) References Cited

U.S. PATENT DOCUMENTS

2018/0356792 A1* 12/2018 Chao .................... G05B 19/408
2020/0257853 A1* 8/2020 Hussain ................ G06F 40/216

OTHER PUBLICATIONS

TommyW_SE, "Pros/Cons: AHCI vs. Raid On (XPS13 9300 NVMe)", url: https://www.dell.com/community/en/conversations/xps/proscons-ahci-vs-raid-on-xps13-9300-nvme/647f89cef4ccf8a8de97b145, Jun. 28, 2020; 8 pages.
Newerprofile, "Should I stick with USB mode or bluetooth mode for wireless mouse?", url: https://www.reddit.com/r/MouseReview/comments/vakpun/should_i_stick_with_usb_mode_or_bluetooth_mode/, Jun. 12, 2022; 5 pages.

(Continued)

*Primary Examiner* — Keshab R Pandey
(74) *Attorney, Agent, or Firm* — McDermott Will & Schulte LLP (57) ABSTRACT

Managing connection configurations of computing components, including identifying performance metrics associated with the information handling system, each information handling system including a particular computing component; calculating a performance metric configuration ratio associated with the particular computing component based on a ratio of the first weighted average and the second weighted average; and calculating an adjusted performance metric configuration ratio based on the performance metric configuration ratio and a performance indicator associated with the performance metric; calculating an optimized performance metric configuration ratio for the computing component based on an average of the adjusted performance metric configuration ratios of the performance metrics; selecting, based on a value of the optimized performance metric configuration ratio, one of the first connection configuration and the second connection configuration; providing instructions to each of the information handling systems indicating the selected connection configuration.

20 Claims, 6 Drawing Sheets

(56) References Cited

OTHER PUBLICATIONS

I_Jani_I, "New NVMe drive installed and underperforming due to RAID on set in BIOS by default", url: https://www.dell.com/community/en/conversations/inspiron/new-nvme-drive-installed-and-underperforming-due-to-raid-on-set-in-bios-by-default/647fa3d7f4ccf8a8de9d4608#M108702, Apr. 28, 2023; 4 pages.

Mikey59, "Switching from RAID to ACHI?", url: https://www.dell.com/community/en/conversations/xps/switching-from-raid-to-achi/647f9b7af4ccf8a8def5ff19, Mar. 24, 2022; 4 pages.

Vyas, Kashyap "AHCI vs IDE vs RAID: Which SATA System is Best for You?", url: https://www.enterprisestorageforum.com/networking/ahci-vs-ide-vs-raid/, Feb. 10, 2023; 10 pages.

\* cited by examiner

MANAGING CONNECTION CONFIGURATIONS OF COMPUTING COMPONENTS OF INFORMATION HANDLING SYSTEMS

BACKGROUND

Field of the Disclosure

The disclosure relates generally to information handling systems, and in particular, managing connection configurations of computing components of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing connection configurations of computing components, including identifying, for each information handling system of a plurality of information handling systems, a plurality of performance metrics associated with the information handling system, each information handling system including a particular computing component; identifying a first subset of information handling systems of the plurality of information handlings systems, the particular computing component of each information handling system of the first subset of information handling systems associated with a first connection configuration; for each information handling system of the first subset: for each performance metric of the plurality of performance metrics: sorting values of the performance metric in an ascending order; and determining, based on the order, a first weighted average of the values of the performance metric; identifying a second subset of information handling systems of the plurality of information handlings systems, the particular computing component of each information handling system of the second subset of information handling systems associated with a second connection configuration; for each information handling system of the second subset: for each performance metric of the plurality of performance metrics: sorting values of the performance metric in an ascending order; and determining, based on the order, a second weighted average of the values of the performance metric; for each performance metric of the plurality of performance metrics: calculating a performance metric configuration ratio associated with the particular computing component based on a ratio of the first weighted average and the second weighted average; and calculating an adjusted performance metric configuration ratio based on the performance metric configuration ratio and a performance indicator associated with the performance metric; calculating an optimized performance metric configuration ratio for the computing component based on an average of the adjusted performance metric configuration ratios of the performance metrics; selecting, based on a value of the optimized performance metric configuration ratio, one of the first connection configuration and the second connection configuration; and providing instructions to each of the information handling systems indicating the selected connection configuration such that each information handling system is aligned with the selected connection configuration for the particular computing component.

Other embodiments of these aspects include corresponding systems, apparatus, and computer programs, configured to perform the actions of the methods, encoded on computer storage devices.

These and other embodiments may each optionally include one or more of the following features. For instance, calculating the performance metric configuration ratio associated with the particular computing component is further based on the ratio of the first weighted average and the second weighted average and a ratio of a number of the particular computing components having the second connection configuration and a number of the particular computing components having the first connection configuration. For each performance metric of the plurality of performance metrics: determining that the performance metric is directly correlated with a performance of the particular computing components; and in response to determining that the performance metric is directly correlated with the performance of the particular computing components, calculating the adjusted performance metric configuration ratio based on multiplying the performance metric configuration ratio with the performance indicator associated with the performance metric. For each performance metric of the plurality of performance metrics: determining that the performance metric is indirectly correlated with a performance of the particular computing components; and in response to determining that the performance metric is directly correlated with the performance of the particular computing components, calculating the adjusted performance metric configuration ratio based on dividing the performance indicator associated with the performance metric by the performance metric configuration ratio. Determining that the value of the optimized performance metric configuration ratio is less than 1; and in response to determining that the value of the optimized performance metric configuration ratio is less than 1, selecting the second connection configuration. Determining that the value of the optimized performance metric configuration ratio is greater than 1; and in response to determining that the value of the optimized performance metric configuration ratio is greater than 1, selecting the first connection configuration. The performance metrics include processor consumption, disk input/output operations per second (IOPS), disk writes per second, and disk reads per second.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing connection configurations of computing components of information handling systems. In short, identifying and switching connection configuration modes of the computing components can be facilitated that scales across device-types (disk, webcam, . . . ) and connection configurations (USB-C, legacy USB, BT, WiFi, RF, . . . ).

Specifically, this disclosure discusses a system and a method for identifying, for each information handling system of a plurality of information handling systems, a plurality of performance metrics associated with the information handling system, each information handling system including a particular computing component; identifying a first subset of information handling systems of the plurality of information handlings systems, the particular computing component of each information handling system of the first subset of information handling systems associated with a first connection configuration; for each information handling system of the first subset: for each performance metric of the plurality of performance metrics: sorting values of the performance metric in an ascending order; and determining, based on the order, a first weighted average of the values of the performance metric; identifying a second subset of information handling systems of the plurality of information handlings systems, the particular computing component of each information handling system of the second subset of information handling systems associated with a second connection configuration; for each information handling system of the second subset: for each performance metric of the plurality of performance metrics: sorting values of the performance metric in an ascending order; and determining, based on the order, a second weighted average of the values of the performance metric; for each performance metric of the plurality of performance metrics: calculating a performance metric configuration ratio associated with the particular computing component based on a ratio of the first weighted average and the second weighted average; and calculating an adjusted performance metric configuration ratio based on the performance metric configuration ratio and a performance indicator associated with the performance metric; calculating an optimized performance metric configuration ratio for the computing component based on an average of the adjusted performance metric configuration ratios of the performance metrics; selecting, based on a value of the optimized performance metric configuration ratio, one of the first connection configuration and the second connection configuration; and providing instructions to each of the information handling systems indicating the selected connection configuration such that each information handling system is aligned with the selected connection configuration for the particular computing component.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
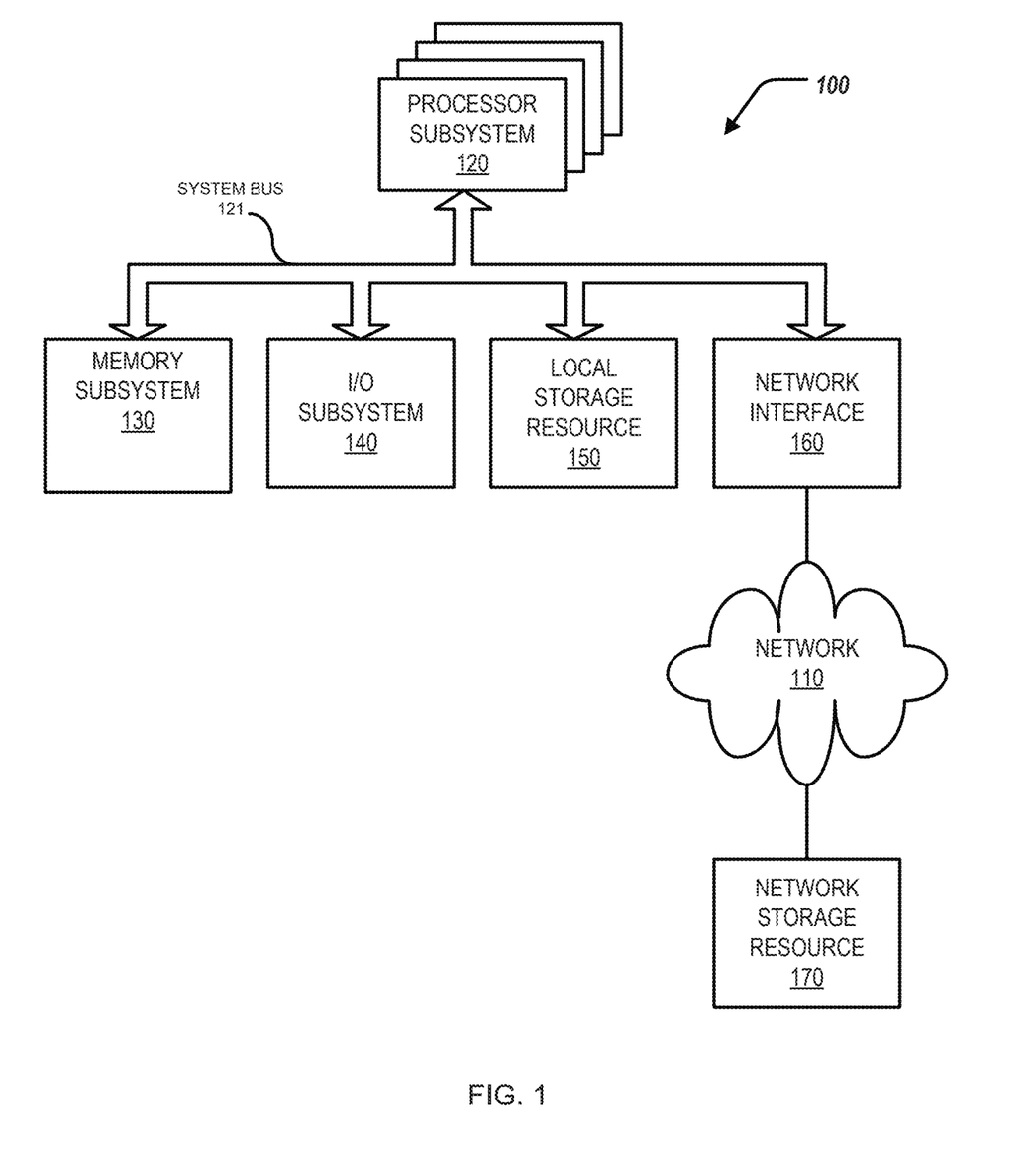
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mounted display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
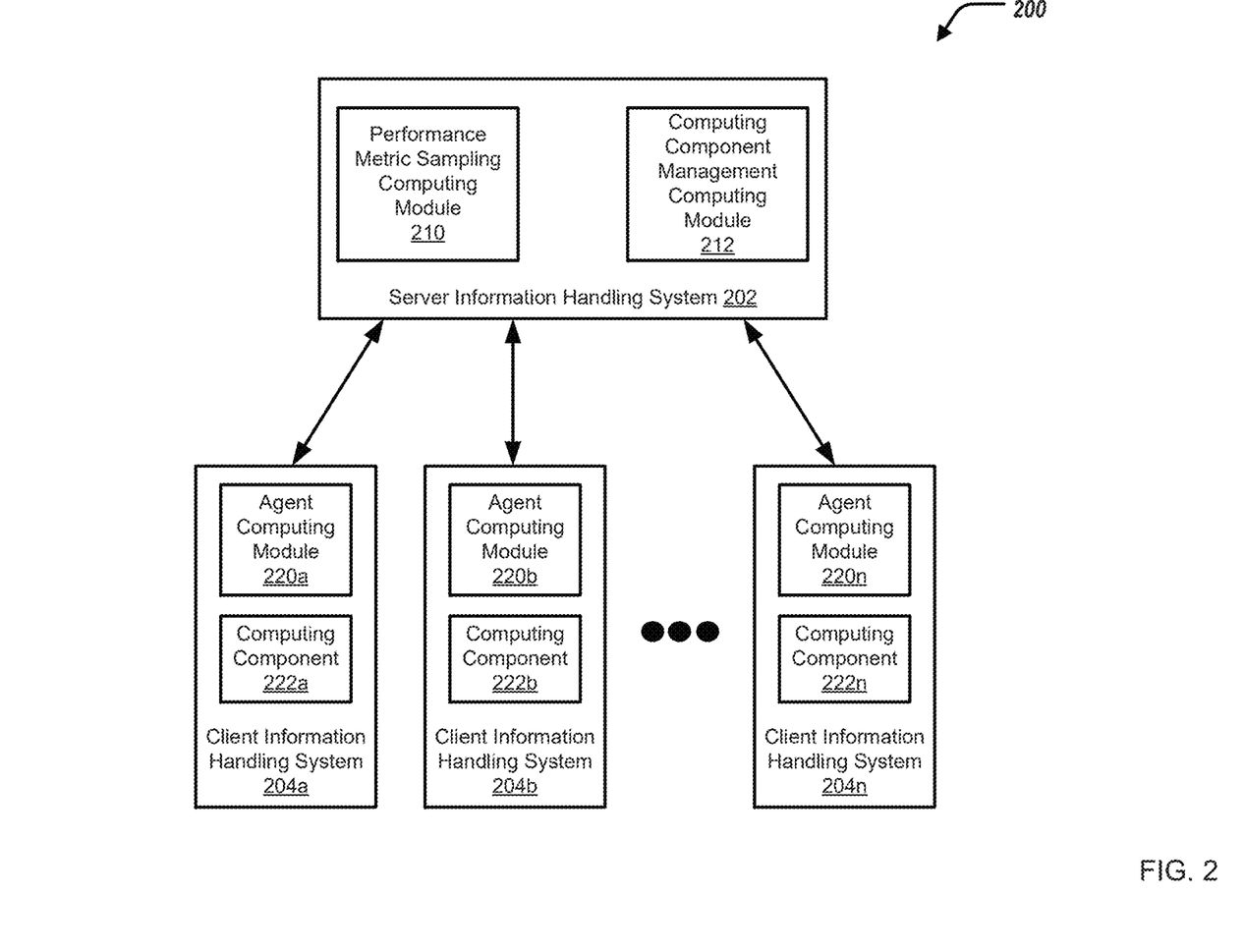
FIG. 2 illustrates a block diagram of an environment for managing connection configurations of computing components of information handling systems.

Turning to FIG. 2, FIG. 2 illustrates an environment 200 including a server information handling system 202 and client information handling systems 204a, 204b, . . . , 204n (collectively referred to as client information handling systems 204). The server information handling system 202 can include a performance metric sampling computing module 210 and a computing component management computing module 212. In some examples, the server information handling system 202 is similar to, or includes, the information handling system 100 of FIG. 1. In some examples, the client information handling system 204 is similar to, or includes, the information handling system 100 of FIG. 1.

Each of the client information handling systems 204 (client information handling systems 204a, 204b, ..., 204n) can include an agent computing module 220 (agent computing module 220a, 220b, ..., 220n) and a computing component 222 (computing component 222a, 222b, ..., 222n). The computing component 222 can include a storage disk, a webcam, a mouse, or the like. The computing component 222 can further be associated with a connection configuration. For example, when the computing component 222 includes a storage disk (disk drive), the connection configuration can include advanced host controller interface (AHCI) or redundant array of inexpensive disks (RAID). For example, when the computing component 222 includes a webcam, the connection configuration can include universal serial bus (USB) 3.2, or a legacy USB mode. For example, when the computing component 222 includes a mouse, the connection configuration can include radio frequency (RF), or Bluetooth (BT) 5.x. For example, when the computing component 222 includes an external disk, the connection configuration can include external serial AT attachment (eSATA), or USB 3.

Each of the client information handling systems 204 can be in communication with the server information handling system 202 (e.g., over a network, the "Internet").

In short, the computing component management computing module 212 can facilitate identifying and switching connection configuration modes of the computing components 222 that scales across device-types (disk, webcam, ...) and connection configurations (USB-C, legacy USB, BT, WiFi, RF, ...).

Figure 3:
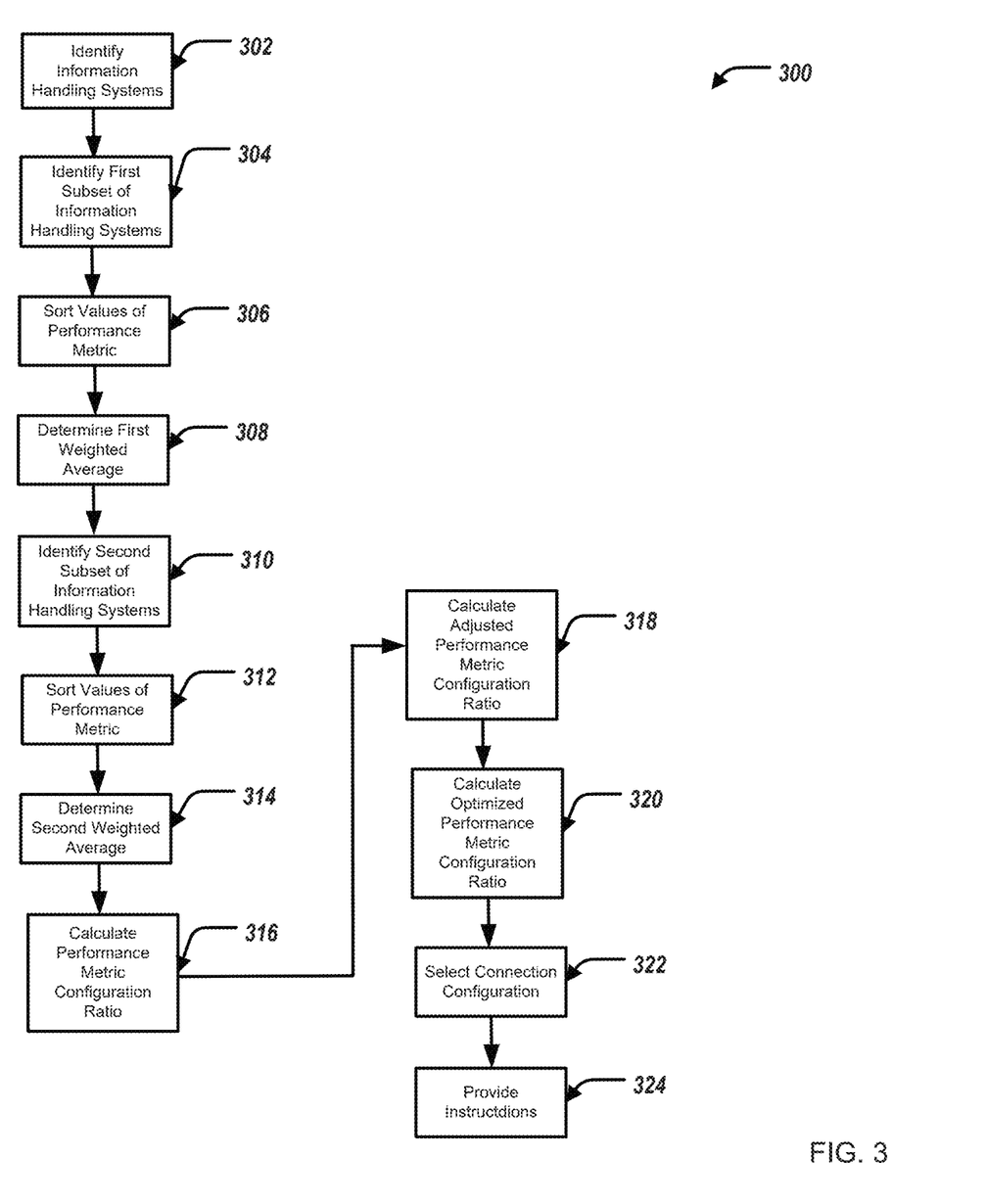
FIG. 3 illustrates a method for managing connection configurations of computing components of information handling systems.

FIG. 3 illustrates a flowchart depicting selected elements of an embodiment of a method 300 for managing connection configurations of computing components of information handling systems. The method 300 may be performed by the information handling system 100, the server information handling system 202, the client information handling system 204, the performance metric sampling computing module 210, the computing component management computing module 212, and/or the agent computing module 220, and with reference to FIGS. 1-2. It is noted that certain operations described in method 300 may be optional or may be rearranged in different embodiments.

The performance metric sampling computing module 210 identifies, for each client information handling system 204, a plurality of performance metrics associated with the client information handling system 204, at 302. The performance metric sampling computing module 210 can collect performance metric data about various device types (computing components 222) at a predetermined sampling interval (and logged in a cyclic manner). For example, the performance metrics can include processor consumption, disk input/output operations per second (IOPS), disk writes per second, and disk reads per second.

The computing component management computing module 212 identifies a first subset of the client information handling systems 204 that each include the computing component 222 associated with a first configuration connection, at 304. That is, each computing component 222 of the first subset of the client information handling systems 204 is associated with the first connection configuration. That is, each computing component 222 of the first subset of the client information handling systems 204 is associated with the first connection configuration between the computing component 222 and other computing elements/modules of the client information handling system 204, such as a motherboard or an integrated circuit board.

The computing component management computing module 212, for each client information handling system 204 of the first subset and for each performance metric of the plurality of performance metrics, sorts the values of the performance metric in an ascending order, at 306. The computing component management computing module 212, further for each client information handling system 204 of the first subset and for each performance metric of the plurality of performance metrics, determines, based on the order, a first weighted average of the values of the performance metric, at 308. For example, for the computing component 222 of a disk drive, the performance metric can be CPU consumption, and the first connection configuration can include a RAID connection configuration. For example, the computing component management computing module 212 sorts the values C1, C2, C3, C4 of a performance metric in ascending order. The computing component management computing module 212 determines the first weighted average of the values C1, C2, C3, C4 of the performance metric (CPU consumption) for the first subset of the client information handling systems 204 (RAID connection configuration) as:

$$\text{first weighted average for } CPU\ (WAC_{RAID}) = \Sigma K_i W_i / \Sigma W_i;$$

where i=sample index & $K_i$=performance metric.

The computing component management computing module 212 identifies a second subset of the client information handling systems 204 that each include the computing component 222 associated with a second configuration connection, at 310. That is, each computing component 222 of the second subset of the client information handling systems 204 is associated with the second connection configuration. That is, each computing component 222 of the second subset of the client information handling systems 204 is associated with the second connection configuration between the computing component 222 and other computing elements/modules of the client information handling system 204, such as a motherboard or an integrated circuit board.

The computing component management computing module 212, for each client information handling system 204 of the second subset and for each performance metric of the plurality of performance metrics, sorts the values of the performance metric in an ascending order, at 312. The computing component management computing module 212, further for each client information handling system 204 of the second subset and for each performance metric of the plurality of performance metrics, determines, based on the order, a second weighted average of the values of the performance metric, at 314. For example, for the computing component 222 of a disk drive, the performance metric can be CPU consumption, and the second connection configuration can include an AHCI connection configuration. For example, the computing component management computing module 212 sorts the values C5, C6, C7, C8 of a performance metric in ascending order. The computing component management computing module 212 determines the second weighted average of the values C5, C6, C7, C8 of the performance metric (CPU consumption) for the second subset of the client information handling systems 204 (AHCI connection configuration) as:

second weighted average for $(WAC_{AHCI}) = \Sigma K_i W_i / \Sigma W_i$;

where i=sample index & $K_i$=performance metric.

The computing component management computing module 212, for each performance metric of the plurality of performance metrics, calculates a performance metric configuration ratio associated with the particular computing component, at 316. Specifically, the computing component management computing module 212, for each performance metric of the plurality of performance metrics, calculates a performance metric configuration ratio associated with the particular computing component 222 based on a ratio of the first weighted average and the second weighted average. For example, the ratio can be first weighted average divided by the second weighted average. Furthermore, the computing component management computing module 212, for each performance metric of the plurality of performance metrics, calculates a performance metric configuration ratio associated with the particular computing component based on a ratio of the first weighted average and the second weighted average and a ratio of the number of the client information handling systems 204 including the computing component 222 having the first connection configuration and the number of the client information handling systems 204 including the computing component 222 having the second connection configuration.

For example, when the performance metric is CPU consumption, the CPU performance metric configuration ratio (optimal CPU configuration ratio (OCCR)):

$$OCCR = (\Sigma WAC_{yRAID}/\Sigma WAC_{yAHCI}) * (1/(C_{RAID}/C_{AHCI}));$$

where y=device index, $C_{RAID}$=Count of RAID enabled devices, & $C_{AHCI}$=Count of AHCI enabled devices.

For example, when the performance metric is disk IOPS, the disk IOPS performance metric configuration ratio (optimal disk IOPS configuration ratio (OCDR):

$$OCDR = (\Sigma WAD_{yRAID}/\Sigma WAD_{yAHCI}) * (1/(C_{RAID}/C_{AHCI}));$$

where y=device index, CRAID=Count of RAID enabled devices, & CAHCI=Count of AHCI enabled devices.

To that end, for notation, for each performance metric x, the performance metric configuration ratio can be represented as OCxR.

The computing component management computing module 212, for each performance metric of the plurality of performance metrics, calculates an adjusted performance metric configuration ratio based on the performance metric configuration ratio and a performance indicator associated with the performance metric, at 318. Specifically, the computing component management computing module 212 determines, for each performance metric of the plurality of performance metrics, whether the performance metric is directly correlated or indirectly correlated with a performance of the computing component 222.

In some examples, the computing component management computing module 212 determines, for a particular performance metric, that the particular performance metric is directly correlated with a performance of the computing component 222, and the computing component management computing module 212 multiplies the performance metric configuration ratio with the performance indicator associated with the particular performance metric. For example, the performance indicator associated with the particular performance metric of the CPU (CPUPerfIndiciator) is 1, such that the adjusted performance metric configuration ratio (POCCR) is:

$$POCCR = OCCR \times CPUPerfindiciator = OCCR \times 1 = OCCR.$$

In general, when the particular performance metric is directly correlated with a performance of the computing component 222, the computing component management computing module 212 computes the adjusted performance metric configuration ratio as:

$$POCxR = OCxR \times Perfindiciator = OxCR \times 1 = OxCR.$$

In some examples, the computing component management computing module 212 determines, for a particular performance metric, that the particular performance metric is indirectly correlated with a performance of the computing component 222, and the computing component management computing module 212 divides the performance indicator associated with the particular performance metric by the performance metric configuration ratio. For example, the performance indicator associated with the particular performance metric of the CPU (CPUPerfIndiciator) is 1, such that the adjusted performance metric configuration ratio (POCCR) is:

$$POCCR = CPUPerfindiciator \div OCCR = 1/OCCR.$$

In general, when the particular performance metric is indirectly correlated with a performance of the computing component 222, the computing component management computing module 212 computes the adjusted performance metric configuration ratio as:

$$POCxR = xPerfindiciator \div OCxR = 1/OCxR.$$

The computing component management computing module 212 calculates an optimized performance metric configuration ratio for the computing component 222, at 320. Specifically, the computing component management computing module 212 calculates the optimized performance metric configuration ratio for the computing component 222 based on an average of the adjusted performance metric configuration ratios of the performance metrics. That is, the computing component management computing module 212 calculates a summation of each of the adjusted performance metric configuration ratios of the performance metrics; determines a count of the computing components 222; and then calculates the optimized performance metric configuration ratio for the computing component 222 as the summation of each of the adjusted performance metric configuration ratios of the performance metrics divided by the count of the computing components 222.

For example, the computing component management computing module 212 calculates the optimized performance metric configuration ratio of the RAID connection configuration and the AHCI connection configuration (POSCR$_{RAID/AHCI}$) as:

$$POSCR_{RAID/AHCI} = \frac{\Sigma POCxR}{\Sigma N};$$

where x=performance metric and N=count of computing components 222.

In summary, the computing component management computing module 212 can calculate the optimized performance metric configuration ratio for any computing component 222 as:

$$POCxR_{mode1:mode2...:modeN} = \Sigma POCxR/\Sigma N =$$
$$\Sigma\left(\left(\left(\Sigma\left(\frac{\Sigma WiXi}{\Sigma Xi}\right)_d m_{Model}: \Sigma\left(\frac{\Sigma WiXi}{\Sigma Xi}\right)_d m_{Mode2} ...: \Sigma\left(\frac{\Sigma WiXi}{\Sigma Xi}\right)_d m_{Modej}\right)\right)*$$
$$(HCF_{Mode}^j/\Sigma Dev_{Mode}^j) \times KPIPerfIndicator\right)/\Sigma N;$$

where m is the performance metric, i is the sample index, j is the Mode index, d is the device index and N is the mode option count.

The computing component management computing module 212 selects, based on the value of the optimized performance metric configuration ratio, one of the first connection configuration and the second connection configuration, at 322. Specifically, the computing component management computing module 212 compares the value of the optimized performance metric configuration ratio to a threshold of 1. When the value of the optimized performance metric configuration ratio is less than 1, the computing component management computing module 212 selects the second connection configuration. For example, the computing component management computing module 212, when the value of the optimized performance metric configuration ratio is less than 1, selects the second connection configuration of the AHCI connection configuration. When the value of the optimized performance metric configuration ratio is greater than 1, the computing component management computing module 212 selects the first connection configuration. For example, the computing component management computing module 212, when the value of the optimized performance metric configuration ratio is less than 1, selects the first connection configuration of the RAID connection configuration.

The computing component management computing module 212 provides instructions to each of the client information handling system 204 indicating the selected connection configuration, at 324. Specifically, the computing component management computing module 212 provides instructions to each of the client information handling system 204 indicating the selected connection configuration such that each of the client information handling system 204 is aligned with the selected connection configuration for the computing component 222. That is, the client information handling system 204 configures the computing component 222 with the selected connection configuration. For example, when the computing component management computing module 212 selects the second connection configuration, the client information handling system 204 configures the computing component 222 with the selected connection configuration. For example, when the computing component management computing module 212 selects the first connection configuration, the client information handling system 204 configures the computing component 222 with the first connection configuration.

In other words, each of the agent computing modules 220 of each of the client information handling systems 204, in response to the instructions from the computing component management computing module 212, configures the connection configuration of the respective computing component 222 in accordance with the instructions.

In an example, FIGS. 5A-5D illustrate tables 502a, 502b, 502c, 502d, respectively (collectively referred to as tables 502). Each of the tables 502 illustrate, respectively, sampling of performance metrics (KPI) for multiple computing components 222 (device). Continuing, the computing component management computing module 212 sorts the CPU values in ascending order for each of the devices. For example, for Device1$_{RAID}$, the values are 65, 68, 71, 81. The computing component management computing module 212 determines the weighted average of CPU values for each device. For example, the weighted average CPU (WAC) for each of the devices is: WAC$_{Dev1Raid}$=73.8; WAC$_{Dev3Raid}$=50.3, WAC$_{Dev4Raid}$=42.2, WAC$_{Dev6Raid}$=42; WAC$_{Dev2Ahei}$=38.4; WAC$_{Dev5Ahei}$=69.7; and WAC$_{Dev7Ahei}$=62.3. The computing component management computing module 212 determines the Optimal KPI Configuration Ratio[OKCR]=$\Sigma$WAK$_{Devxx1}$:$\Sigma$WAK$_{Devxx2}$:$\Sigma$WAK$_{Devxx3}$:$\Sigma$WAK$_{Devxx4}$; where K=KPI Metric, Devxx=Device Type. For example, the computing component management computing module 212 determines the optimal CPU configuration ratio [OCCR] as $\Sigma$WAC$_{Opti3KRaid}$:$\Sigma$WAC$_{Opti3KAhci}$={(73.8+50.3+42.2+42)×3}/{(38.4+69.7+62.3)×4}=624.9/681.6.

The computing component management computing module 212 multiplies OCCR with KPIPerfVector (KPIPerfVector is direct or indirect). For example, CPUPerfVector is inversely proportional, thus the computing component management computing module 212 calculates the performant OCCR [POCCR]=1/(624.9/681.6)=681.6:624.9=1.09:1. The computing component management computing module 212 calculates PODCR (Disk IOPS), PORCR (Reads/sec) & POWCR (write/sec). The computing component management computing module 212 calculates the average of all KPI POxCR Values (Perf_POxCR)=$\Sigma$POxCR/N; where x is the KPI metric. Continuing, the computing component management computing module 212 determines the performance oriented SATA Mode Ratio of RAID over AHCI (POSCR$_{RAID/AHCI}$)=(POCCR+PODCR+PORCR+POWCR)/4=(1.09:1+0.97:1+1.11:1+0.65:1)/4. The computing component management computing module 212 determines that the POSCR$_{RAID/AHCI}$=0.95; and thus, AHCI is a better performer over RAID by 5%. The computing component management computing module 212 provides instructions to each of the client information handling systems 204 indicating the selected connection configuration of AHCI for the disk drive computing module 222, and the client information handling systems 204 configures the computing component 222 with the AHCI connection configuration.

Figure 4:
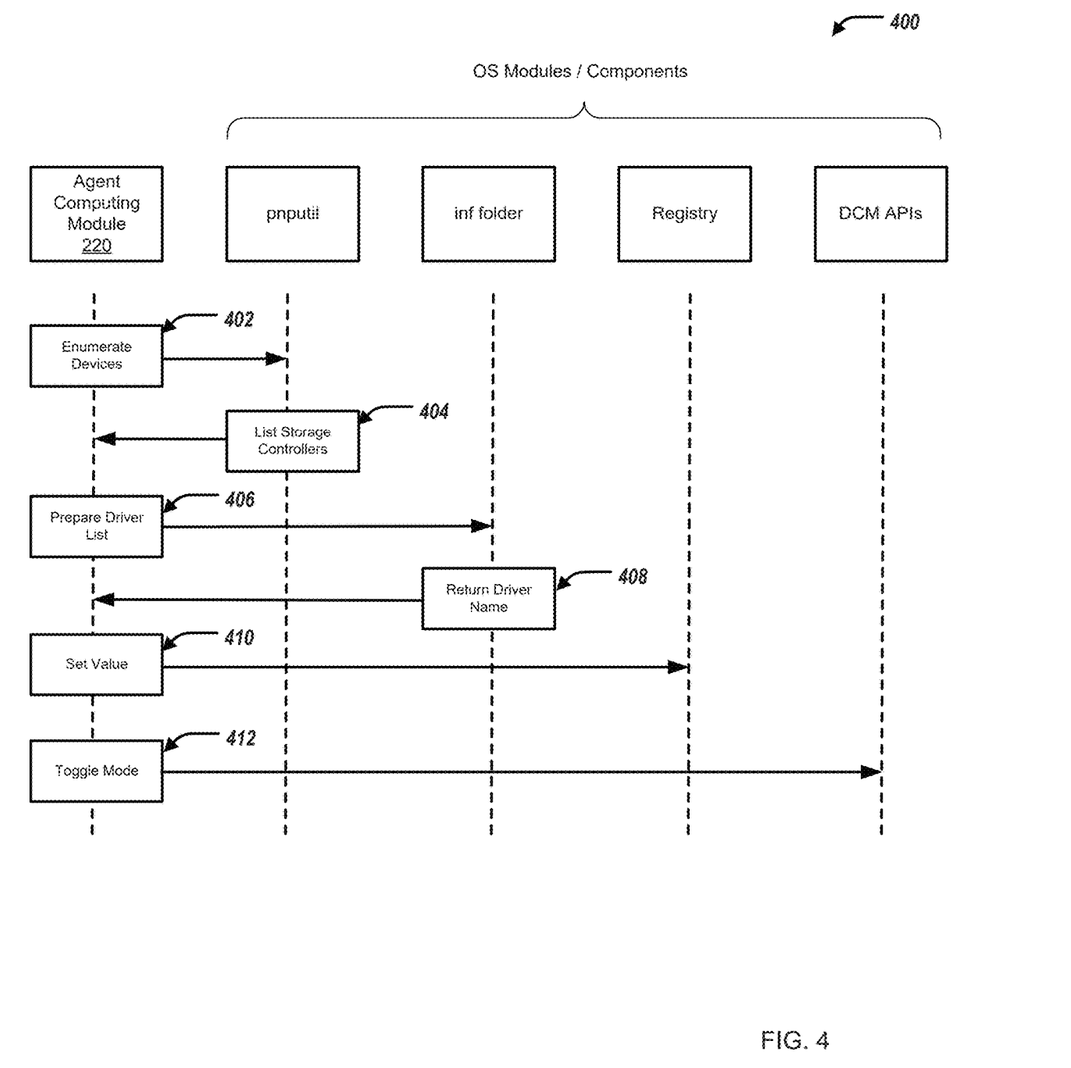
FIG. 4 illustrates a swim-lane diagram for managing connection configurations of computing components of information handling systems.
Figure 5A:
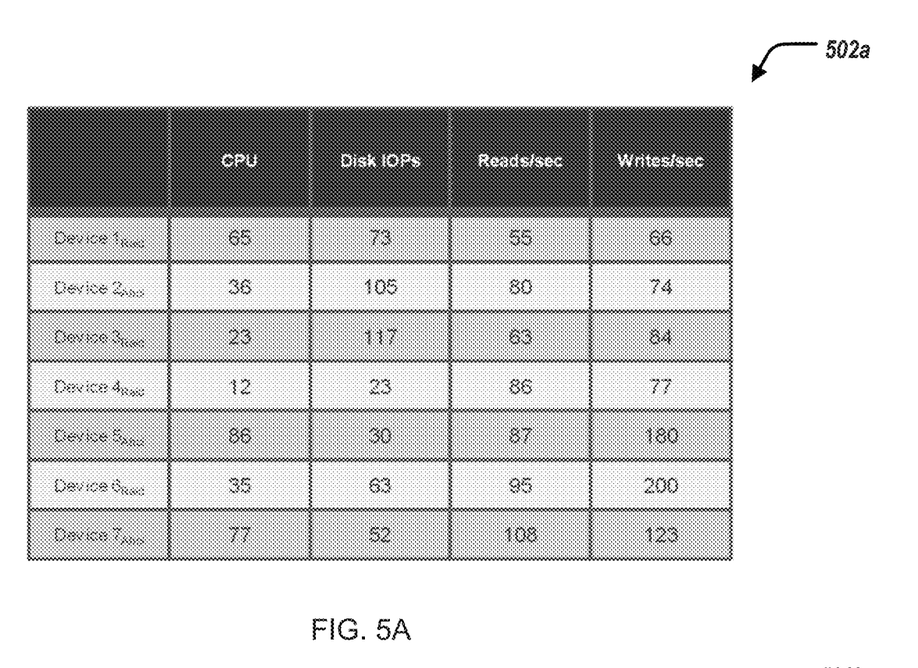
FIGS. 5A-5D illustrate example tables of performance metric values of computing components of information handling systems.
Figure 5B:
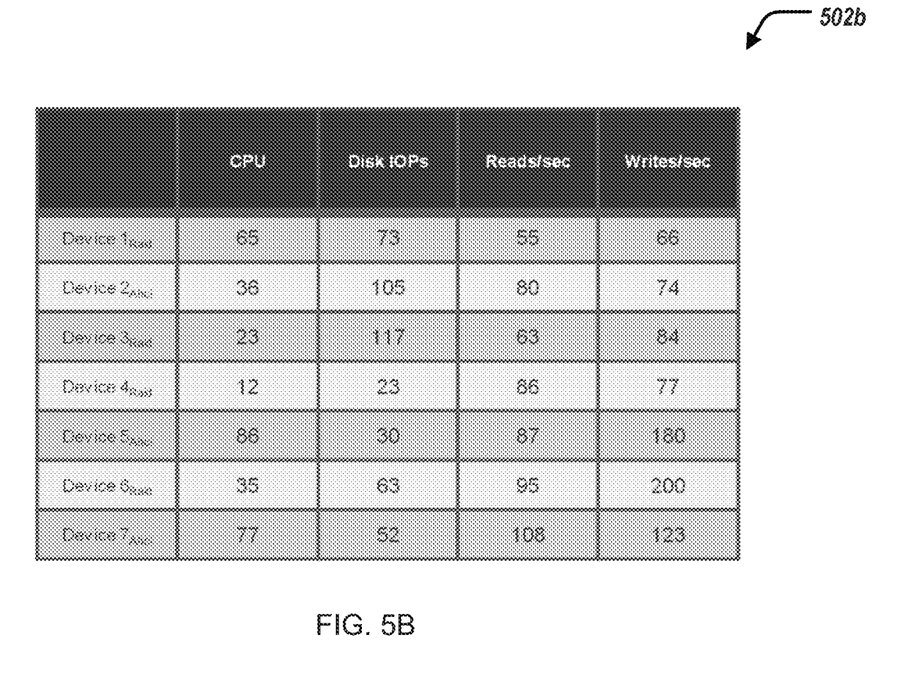
Figure 5C:
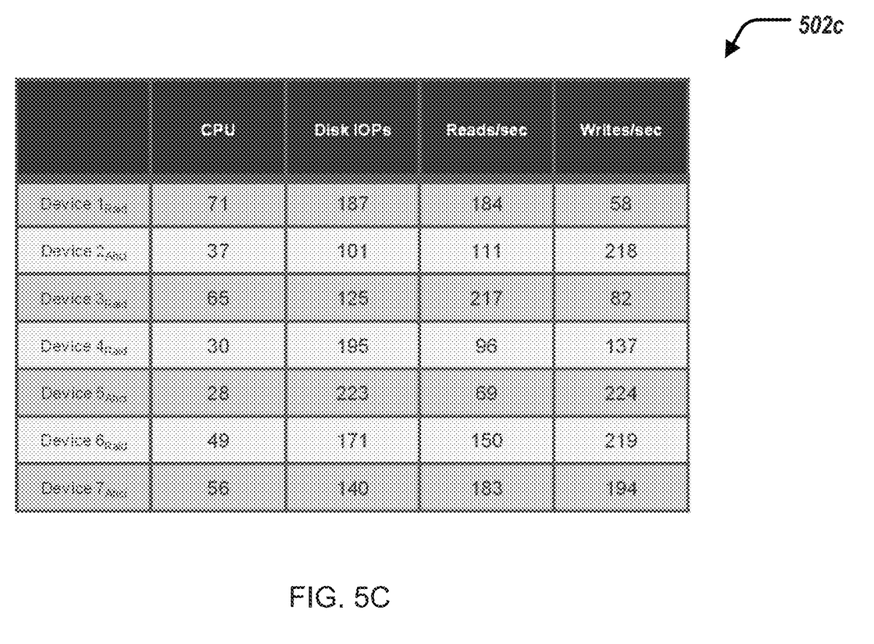
Figure 5D:
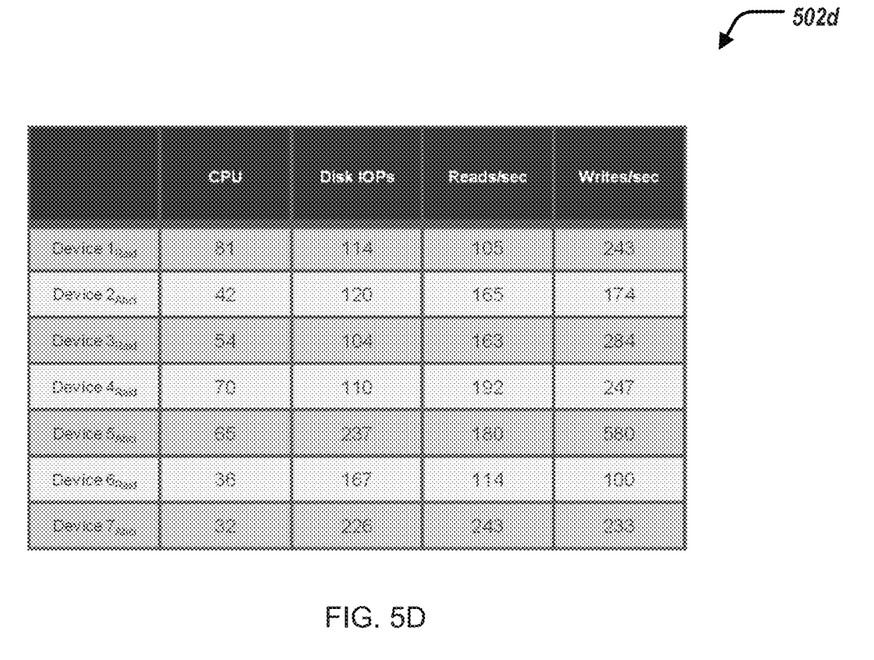

FIG. 4 illustrates a swim-lane diagram depicting selected elements of an embodiment of a method 400 for managing connection configurations of computing components of information handling systems. The method 400 may be performed by the information handling system 100, the server information handling system 202, the client information handling system 204, the performance metric sampling computing module 210, the computing component management computing module 212, and/or the agent computing module 220, and with reference to FIGS. 1-2. It is noted that certain operations described in method 400 may be optional or may be rearranged in different embodiments.

The agent computing module 220 enumerates the computing components 222 for the SCSI adapter class, at 402. The pnputil computing component can list storage controllers with oem*.inf and driver running state information, at 404. The agent computing module 220 can iterate through the driver list and prepare a driver list for each storage controller, at 406. The inf folder computing component can return the driver name mapped to each storage controller, at 408. The agent computing module 220 can set the value of the start override key for the targeted driver which handles the appropriate SATA mode, at 410. The agent computing module 220 can toggle to the desired SATA mode, at 412.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing connection configurations of computing components, including:
   identifying, for each information handling system of a plurality of information handling systems, a plurality of performance metrics associated with the information handling system, each information handling system including a particular computing component;
   identifying a first subset of information handling systems of the plurality of information handlings systems, the particular computing component of each information handling system of the first subset of information handling systems associated with a first connection configuration;
   for each information handling system of the first subset:
      for each performance metric of the plurality of performance metrics:
         sorting values of the performance metric in an ascending order; and
         determining, based on the order, a first weighted average of the values of the performance metric;
   identifying a second subset of information handling systems of the plurality of information handlings systems, the particular computing component of each information handling system of the second subset of information handling systems associated with a second connection configuration;
   for each information handling system of the second subset:
      for each performance metric of the plurality of performance metrics:
         sorting values of the performance metric in an ascending order; and
         determining, based on the order, a second weighted average of the values of the performance metric;
   for each performance metric of the plurality of performance metrics:
      calculating a performance metric configuration ratio associated with the particular computing component based on a ratio of the first weighted average and the second weighted average; and
      calculating an adjusted performance metric configuration ratio based on the performance metric configuration ratio and a performance indicator associated with the performance metric;
   calculating an optimized performance metric configuration ratio for the computing component based on an average of the adjusted performance metric configuration ratios of the performance metrics;
   selecting, based on a value of the optimized performance metric configuration ratio, one of the first connection configuration and the second connection configuration; and
   providing instructions to each of the information handling systems indicating the selected connection configuration such that each information handling system is aligned with the selected connection configuration for the particular computing component.

2. The computer-implemented method of claim 1, wherein calculating the performance metric configuration ratio associated with the particular computing component is further based on the ratio of the first weighted average and the second weighted average and a ratio of a number of the particular computing components having the second connection configuration and a number of the particular computing components having the first connection configuration.

3. The computer-implemented method of claim 1, further including:
   for each performance metric of the plurality of performance metrics:
      determining that the performance metric is directly correlated with a performance of the particular computing components; and in response to determining that the performance metric is directly correlated with the performance of the particular computing components, calculating the adjusted performance metric configuration ratio based on multiplying the performance metric configuration ratio with the performance indicator associated with the performance metric.

4. The computer-implemented method of claim 1, further including:
for each performance metric of the plurality of performance metrics:
determining that the performance metric is indirectly correlated with a performance of the particular computing components; and
in response to determining that the performance metric is directly correlated with the performance of the particular computing components, calculating the adjusted performance metric configuration ratio based on dividing the performance indicator associated with the performance metric by the performance metric configuration ratio.

5. The computer-implemented method of claim 1, further including:
determining that the value of the optimized performance metric configuration ratio is less than 1; and
in response to determining that the value of the optimized performance metric configuration ratio is less than 1, selecting the second connection configuration.

6. The computer-implemented method of claim 1, further including:
determining that the value of the optimized performance metric configuration ratio is greater than 1; and
in response to determining that the value of the optimized performance metric configuration ratio is greater than 1, selecting the first connection configuration.

7. The computer-implemented method of claim 1, wherein the performance metrics include processor consumption, disk input/output operations per second (IOPS), disk writes per second, and disk reads per second.

8. An information handling system comprising a processor having access to memory media storing instructions executable by the processor to perform operations, comprising:
identifying, for each information handling system of a plurality of information handling systems, a plurality of performance metrics associated with the information handling system, each information handling system including a particular computing component;
identifying a first subset of information handling systems of the plurality of information handlings systems, the particular computing component of each information handling system of the first subset of information handling systems associated with a first connection configuration;
for each information handling system of the first subset:
for each performance metric of the plurality of performance metrics:
sorting values of the performance metric in an ascending order; and
determining, based on the order, a first weighted average of the values of the performance metric;
identifying a second subset of information handling systems of the plurality of information handlings systems, the particular computing component of each information handling system of the second subset of information handling systems associated with a second connection configuration;
for each information handling system of the second subset:
for each performance metric of the plurality of performance metrics:
sorting values of the performance metric in an ascending order; and
determining, based on the order, a second weighted average of the values of the performance metric;
for each performance metric of the plurality of performance metrics:
calculating a performance metric configuration ratio associated with the particular computing component based on a ratio of the first weighted average and the second weighted average; and
calculating an adjusted performance metric configuration ratio based on the performance metric configuration ratio and a performance indicator associated with the performance metric;
calculating an optimized performance metric configuration ratio for the computing component based on an average of the adjusted performance metric configuration ratios of the performance metrics;
selecting, based on a value of the optimized performance metric configuration ratio, one of the first connection configuration and the second connection configuration; and
providing instructions to each of the information handling systems indicating the selected connection configuration such that each information handling system is aligned with the selected connection configuration for the particular computing component.

9. The information handling system of claim 8, wherein calculating the performance metric configuration ratio associated with the particular computing component is further based on the ratio of the first weighted average and the second weighted average and a ratio of a number of the particular computing components having the second connection configuration and a number of the particular computing components having the first connection configuration.

10. The information handling system of claim 8, the operations further including:
for each performance metric of the plurality of performance metrics:
determining that the performance metric is directly correlated with a performance of the particular computing components; and
in response to determining that the performance metric is directly correlated with the performance of the particular computing components, calculating the adjusted performance metric configuration ratio based on multiplying the performance metric configuration ratio with the performance indicator associated with the performance metric.

11. The information handling system of claim 8, the operations further including:
for each performance metric of the plurality of performance metrics:
determining that the performance metric is indirectly correlated with a performance of the particular computing components; and
in response to determining that the performance metric is directly correlated with the performance of the particular computing components, calculating the adjusted performance metric configuration ratio based on dividing the performance indicator associated with the performance metric by the performance metric configuration ratio.

12. The information handling system of claim 8, the operations further including:
    determining that the value of the optimized performance metric configuration ratio is less than 1; and
    in response to determining that the value of the optimized performance metric configuration ratio is less than 1, selecting the second connection configuration.

13. The information handling system of claim 8, the operations further including:
    determining that the value of the optimized performance metric configuration ratio is greater than 1; and
    in response to determining that the value of the optimized performance metric configuration ratio is greater than 1, selecting the first connection configuration.

14. The information handling system of claim 8, wherein the performance metrics include processor consumption, disk input/output operations per second (IOPS), disk writes per second, and disk reads per second.

15. A non-transitory computer-readable medium storing software comprising instructions executable by one or more computers which, upon such execution, cause the one or more computers to perform operations comprising:
    identifying, for each information handling system of a plurality of information handling systems, a plurality of performance metrics associated with the information handling system, each information handling system including a particular computing component;
    identifying a first subset of information handling systems of the plurality of information handlings systems, the particular computing component of each information handling system of the first subset of information handling systems associated with a first connection configuration;
    for each information handling system of the first subset:
        for each performance metric of the plurality of performance metrics:
            sorting values of the performance metric in an ascending order; and
            determining, based on the order, a first weighted average of the values of the performance metric;
    identifying a second subset of information handling systems of the plurality of information handlings systems, the particular computing component of each information handling system of the second subset of information handling systems associated with a second connection configuration;
    for each information handling system of the second subset:
        for each performance metric of the plurality of performance metrics:
            sorting values of the performance metric in an ascending order; and
            determining, based on the order, a second weighted average of the values of the performance metric;
    for each performance metric of the plurality of performance metrics:
        calculating a performance metric configuration ratio associated with the particular computing component based on a ratio of the first weighted average and the second weighted average; and
        calculating an adjusted performance metric configuration ratio based on the performance metric configuration ratio and a performance indicator associated with the performance metric;
    calculating an optimized performance metric configuration ratio for the computing component based on an average of the adjusted performance metric configuration ratios of the performance metrics;
    selecting, based on a value of the optimized performance metric configuration ratio, one of the first connection configuration and the second connection configuration; and
    providing instructions to each of the information handling systems indicating the selected connection configuration such that each information handling system is aligned with the selected connection configuration for the particular computing component.

16. The information handling system of claim 15, wherein calculating the performance metric configuration ratio associated with the particular computing component is further based on the ratio of the first weighted average and the second weighted average and a ratio of a number of the particular computing components having the second connection configuration and a number of the particular computing components having the first connection configuration.

17. The information handling system of claim 15, the operations further including:
    for each performance metric of the plurality of performance metrics:
        determining that the performance metric is directly correlated with a performance of the particular computing components; and
        in response to determining that the performance metric is directly correlated with the performance of the particular computing components, calculating the adjusted performance metric configuration ratio based on multiplying the performance metric configuration ratio with the performance indicator associated with the performance metric.

18. The information handling system of claim 15, the operations further including:
    for each performance metric of the plurality of performance metrics:
        determining that the performance metric is indirectly correlated with a performance of the particular computing components; and
        in response to determining that the performance metric is directly correlated with the performance of the particular computing components, calculating the adjusted performance metric configuration ratio based on dividing the performance indicator associated with the performance metric by the performance metric configuration ratio.

19. The information handling system of claim 15, the operations further including:
    determining that the value of the optimized performance metric configuration ratio is less than 1; and
    in response to determining that the value of the optimized performance metric configuration ratio is less than 1, selecting the second connection configuration.

20. The information handling system of claim 15, the operations further including:
    determining that the value of the optimized performance metric configuration ratio is greater than 1; and
    in response to determining that the value of the optimized performance metric configuration ratio is greater than 1, selecting the first connection configuration.

* * * * *